United States Patent
Choi et al.

(10) Patent No.: US 12,241,612 B2
(45) Date of Patent: Mar. 4, 2025

(54) LIGHTING APPARATUS FOR A VEHICLE

(71) Applicants: HYUNDAI MOTOR COMPANY, Seoul (KR); KIA CORPORATION, Seoul (KR)

(72) Inventors: Chang Hoon Choi, Suwon-si (KR); Byeong Ho Jeong, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/516,693

(22) Filed: Nov. 21, 2023

(65) Prior Publication Data

US 2024/0353081 A1    Oct. 24, 2024

(30) Foreign Application Priority Data

Apr. 18, 2023    (KR) .................. 10-2023-0050718

(51) Int. Cl.
*F21S 41/19*    (2018.01)
*F21S 41/36*    (2018.01)
*F21S 45/47*    (2018.01)
*F21S 41/143*    (2018.01)

(52) U.S. Cl.
CPC ............. *F21S 45/47* (2018.01); *F21S 41/192* (2018.01); *F21S 41/36* (2018.01); *F21S 41/143* (2018.01)

(58) Field of Classification Search
CPC .. F21S 2/005; F21S 45/49; F21S 41/19; F21S 41/153; F21S 41/151; F21V 21/14; F21V 21/145; F21V 21/005; F21Y 2107/50; B60Q 2200/36; B60Q 1/2611; B60Q 1/04; B60Q 1/20; B29L 2031/747; F21W 2107/10; F21W 2102/00; F21W 2103/55; F21W 2102/13; F21W 2102/30; F21W 2103/10; F21W 2103/20; F21W 2105/00; H01R 2201/26

See application file for complete search history.

(56) References Cited

U.S. PATENT DOCUMENTS

| | | | |
|---|---|---|---|
| 7,237,936 B1 * | 7/2007 | Gibson | F21S 45/33 |
| | | | 362/547 |
| 10,018,343 B2 | 7/2018 | Wasserman et al. | |
| 10,195,981 B1 * | 2/2019 | Wu | F21S 45/48 |
| 10,344,933 B2 | 7/2019 | Lee et al. | |
| 2013/0135882 A1 | 5/2013 | Choi | |
| 2014/0268843 A1 * | 9/2014 | Ruprecht | B60Q 1/0683 |
| | | | 362/487 |

FOREIGN PATENT DOCUMENTS

| | | |
|---|---|---|
| JP | 2006294502 A | 10/2006 |
| JP | 2007018762 A | 1/2007 |
| KR | 20130048540 A | 5/2013 |
| KR | 20130058350 A | 6/2013 |
| KR | 101300577 B1 | 8/2013 |

\* cited by examiner

*Primary Examiner* — Omar Rojas Cadima
(74) *Attorney, Agent, or Firm* — Lempia Summerfield Katz LLC

(57) ABSTRACT

A lighting apparatus for a vehicle includes a base plate having a plurality of mounting portions and a plurality of lighting modules detachably mounted to the plurality of mounting portions. The plurality of lighting modules is configured to radiate light and to define a design of the lighting apparatus depending on locations at which the lighting modules are mounted.

14 Claims, 12 Drawing Sheets

SURFACE-EMITTING LIGHTING

LIGHTING APPARATUS FOR A VEHICLE

CROSS-REFERENCE TO RELATED APPLICATION

This application claims the benefit of and priority to Korean Patent Application No. 10-2023-0050718, filed on Apr. 18, 2023, in the Korean Intellectual Property Office, the entire disclosure of which is incorporated herein by reference.

BACKGROUND

1. Technical Field

The present disclosure relates to a lighting apparatus for a vehicle which is capable of providing diverse lighting design by virtue of various combinations of standardized lighting modules and of facilitating replacement of the lighting modules.

2. Description of the Related Art

In general, vehicles are provided with lighting apparatuses that are intended to allow objects, which are located ahead of a viewer in a direction of travel, to be clearly seen during night driving. Lighting apparatuses are also intended to notify another vehicle or a person walking on a road on which a user's vehicle is traveling. A lamp, which is also referred to as a headlight, is a lighting apparatus configured to illuminate a road ahead of a vehicle in a direction in which the vehicle including the lamp travels.

The lamps may be classified into a head lamp, a fog lamp, a turn signal, a brake lamp, a reversing lamp, and the like, which are set to radiate light toward a road surface in different directions. The head lamp is set to output a low beam in a general traveling situation and to output a high beam in a special situation.

Particularly, because a lamp, which is configured to be externally mounted on a vehicle, contributes to a quality of a product from a design perspective, lighting design and illumination effects of a vehicle are also important.

Generally, lighting, which is provided at a vehicle, is designed according to the configuration of the head lamp. However, because production of a head lamp puts emphasis on the aesthetics of the head lamp, the head lamp is designed only from an aesthetic point of view, regardless of development of lighting technology.

Furthermore, because a lamp is designed according to the complete or overall design of a mobility product, for example, a vehicle, free design of the lamp is restricted, and there is a limit to optimization of performance.

In addition, due to its complicated structure, a head lamp must be completely replaced with a new one when the head lamp malfunctions, thus production cost may increase, and convenience in repair work may also be deteriorated.

Details described as the background art are intended merely for the purpose of promoting an understanding of the background of the present disclosure. The Background section should not be construed as an acknowledgment of the prior art that is already known to those of ordinary skill in the art.

SUMMARY

Therefore, the present disclosure has been made in view of the above problems. It is an object of the present disclosure to provide a lighting apparatus for a vehicle, which is capable of allowing for diverse lighting design by virtue of various combinations of standardized lighting modules. Additionally, the lighting apparatus may facilitate replacement of the lighting modules, thus reducing repair cost when one or more lighting modules malfunction.

In accordance with the present disclosure, the above and other objects can be accomplished by the provision of a lighting apparatus for a vehicle. The lighting apparatus includes a base plate having a plurality of mounting portions and a plurality of lighting modules detachably mounted to the plurality of mounting portions. The plurality of lighting modules is configured to radiate light and to define a design of the lighting apparatus depending on locations at which the lighting modules are mounted.

The plurality of lighting modules may include at least one high beam lighting module and at least one low beam lighting module.

Each of the plurality of lighting modules may include at least one light source unit and at least one heat sink, wherein the at least one light source unit includes a light source portion configured to radiate light and a board portion on which the light source portion is mounted. The at least one heat sink is coupled to the board portion and includes a heat dissipation portion configured to dissipate heat generated during radiation of light from the light source portion.

The plurality of lighting modules may be mounted on the base plate such that a board portion and a heat sink of one of the plurality of lighting modules are disposed in an orientation different from an orientation of a board portion and a heat sink of an adjacent one of the plurality of lighting modules.

The plurality of lighting modules may be arranged such that a light source portion of one of the plurality of lighting modules is disposed so as to be close to or to be spaced apart from a light source portion of another of the plurality of lighting modules depending on a direction in which the board respective portions are arranged.

Each of the plurality of lighting modules may further include a holder to which the at least one light source unit is mounted. The holder may include a lens unit through which light radiated from the at least one light source unit is transmitted.

The holder may extend in a forward/rearward direction and the light source portion and the lens unit may be disposed in the forward/rearward direction relative to the holder such that the lighting module on the base plate radiates light in a spot-emitting fashion.

The at least one heat sink may be provided behind the at least one light source unit and may be provided with a coupler, which is coupled to the mounting portion of the base plate.

A portion or the entirety of an outer surface of each of the plurality of lighting modules may have the same shape such that contours of the holders of each of the plurality of lighting modules coincide with each other when the plurality of lighting modules is arranged in the lighting apparatus.

The holder may include a fastener, which is detachably fastened to the board portion of the light source unit.

The fastener may be detachably fastened to the at least one heat sink through the board portion of the at least one light source unit such that the at least one light source unit and the at least one heat sink are held by the holder.

Each of the plurality of lighting modules may include a plurality of light source units, which are arranged in a vertical direction or in a horizontal direction and are unified through a single lens portion such that the lighting module on the base plate radiates light in a surface-emitting fashion.

Each of the plurality of lighting modules may further include at least one reflection unit configured to reflect light radiated from a corresponding one of the plurality of light source units and to output the light through the lens portion.

The at least one reflection unit may include a plurality of reflection units. Each reflection unit may be disposed in a vertical direction or a horizontal direction so as to correspond to a respective one of the plurality of light source units. The plurality of light source units and the plurality of reflection units may be provided in the lens portion.

The at least one heat sink of each of the plurality of lighting modules may include a plurality of heat sinks. Each of the plurality of heat sinks may be connected to a corresponding one of the plurality of light source units. One or each of the plurality of heat sinks may be provided with a coupler, which is coupled to a corresponding one of the plurality of mounting portions of the base plate.

The base plate may be partitioned into a plurality of base plate parts, which have a difference in height therebetween such that mounting portions of one of the plurality of base plate parts are spaced apart from mounting portions of another of the plurality of base plate parts in a forward/rearward direction.

BRIEF DESCRIPTION OF THE DRAWINGS

The above and other objects, features, and advantages of the present disclosure should be more clearly understood from the following detailed description taken in conjunction with the accompanying drawings, in which.

DETAILED DESCRIPTION OF EMBODIMENTS

Figure 1:
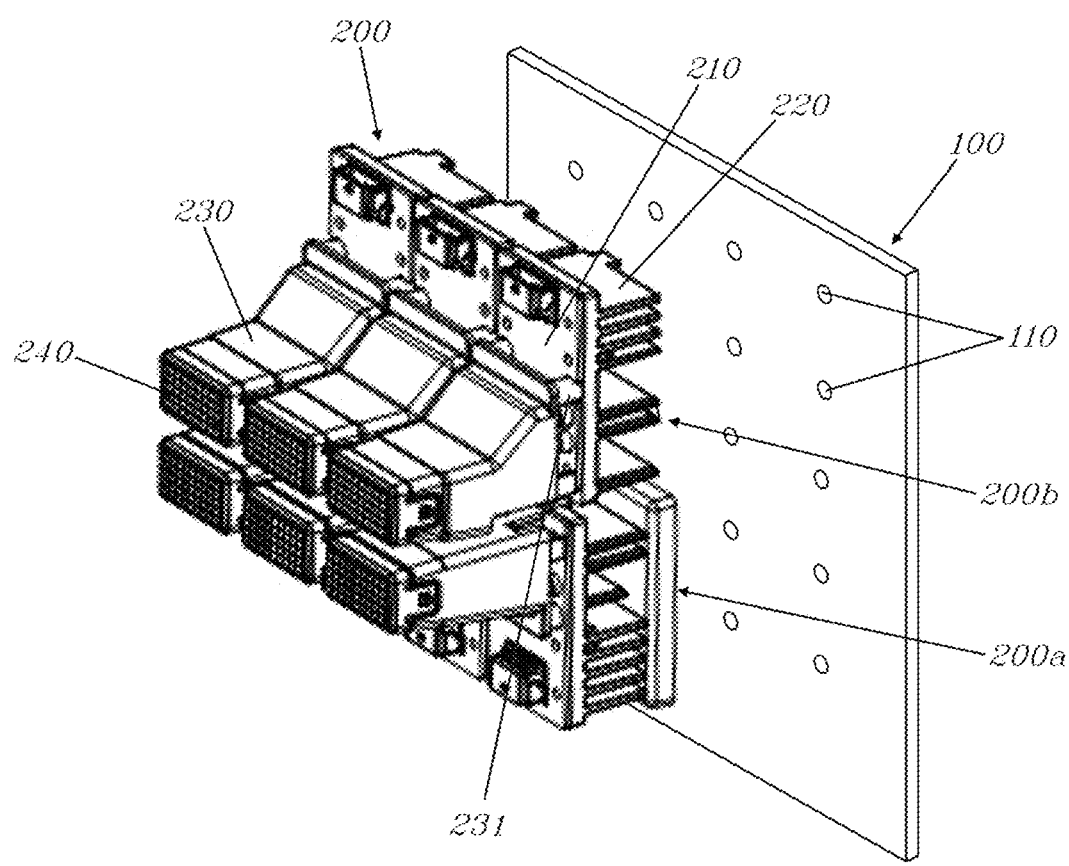
FIG. 1 is a view illustrating a lighting apparatus for a vehicle according to an embodiment of the present disclosure.

Reference is now made in detail to several embodiments of the present disclosure, examples of which are illustrated in the accompanying drawings. Wherever possible, the same reference numbers are used throughout the drawings to refer to the same or like parts.

A description is now given in detail according to several embodiments disclosed herein, with reference to the accompanying drawings. For the sake of brevity of description with reference to the drawings, the same or equivalent components may be denoted by the same reference numbers, and descriptions thereof have not been repeated.

In general, suffixes such as "module" and "unit", when used in the following description, may be used to refer to elements or components of the for easy preparation specification. The use of such suffixes herein is merely intended to facilitate the description of the specification, and the suffixes do not imply any special meaning or function.

Furthermore, in the following description of embodiments disclosed herein, if a detailed description of known functions or configurations related to the disclosure would have made the subject matter of the disclosure unclear, such a detailed description has been omitted. The accompanying drawings are used to facilitate understanding of various technical features, and it should be understood that the embodiments presented herein are not limited by the accompanying drawings. As such, the present disclosure should be construed to extend to any alterations, equivalents, and substitutes, in addition to those which are particularly set out in the accompanying drawings.

It should be understood that although the terms "first", "second", etc. may be used herein to describe various elements, these elements should not be construed as being limited by these terms. These terms are only used to distinguish one element from another.

It should be understood that, when an element is referred to as being "connected to" another element, there may be intervening elements present, or the element may be directly connected with the other element. In contrast, it should be understood that, when an element is referred to as being "directly connected to" another element, there are no intervening elements present.

A singular representation may include a plural representation unless the context clearly indicates otherwise.

Terms such as "includes" or "has" and variations thereof used herein should be considered as indicating the presence of various features, numbers, steps, operations, elements, components or combinations thereof disclosed in the specification. It should be understood that the presence or addition of one or more other features, numbers, steps, operations, elements, components or combinations thereof is not excluded. When a component, device, element, or the like of the present disclosure is described as having a purpose or performing an operation, function, or the like, the component, device, or element should be considered herein as being "configured to" meet that purpose or perform that operation or function.

Hereinafter, a lighting apparatus for a vehicle according to an embodiment of the present disclosure is described with reference to the accompanying drawings.

As illustrated in FIG. 1, the lighting apparatus for a vehicle according to an embodiment of the present disclosure includes a base plate 100 having a plurality of mounting portions 110 and includes a lighting module 200 detachably mounted on the plurality of mounting portions 110 and configured to radiate light. The design of the lighting apparatus is decided depending on a disposition or orientation in which the lighting module 200 is positioned relative to the mounting portions 110.

The base plate 100 may be mounted on the body of a vehicle and may be applied to a head lamp. The base plate 100 may be formed to have the shape of a plate having a predetermined area in order to allow the lighting module 200 to be freely mounted at a desired location. Consequently, because the base plate 100 has a predetermined area, the range in which the lighting module 200 can be mounted may be increased, for example, by increasing the predetermined area.

The base plate 100 may be made of a steel body because the lighting module 200 may be mounted on the base plate 100. The base plate 100 may be provided with the plurality of mounting portions 110 so as to allow the lighting module 200 to be mounted thereon.

In order to fasten the lighting module 200 to the mounting portions 110 using an interference fit or interlocking structure, various fastening structures, such as a hook fastening structure, or a snap fit fastening structure, may be applied. Among these fastening structures, bolts may be applied in order to maintain a firmly fastened state.

The lighting apparatus according to an embodiment of the present disclosure may be comprised of a plurality of lighting modules 200. The design of the lighting apparatus is defined depending on locations at which the lighting modules 200 are mounted on the base plate 100.

By virtue of standardization of the lighting modules 200, it is possible to reduce production cost of the lighting modules 200. Even when some of the lighting modules 200 malfunction, it is possible to simplify a repair procedure by replacing only the malfunctioning lighting modules 200.

Particularly, when the lighting modules 200 are mounted on the base plate 100, the lighting modules 200 may be selectively mounted on the base plate 100 at various locations. Furthermore, by adjusting the number of lighting modules 200 mounted on the base plate 100, it is possible to freely design the lighting apparatus and to improve the capability of the lighting apparatus.

Accordingly, by virtue of various designs of the lighting apparatus through combination of the standardized lighting modules 200, it is possible to provide diversity of design. Additionally, when some of the lighting modules 200 malfunction, it is possible to simplify the replacement procedure, reduce the repair cost, and improve convenience in repair operation.

Specifically, the lighting modules 200 may be composed of at least one high-beam-lighting module 200a and at least one low-beam-lighting module 200b.

The lighting apparatus according to an embodiment of the present disclosure may be applied to a head lamp, which is capable of performing any one of a high beam function and a low beam function.

Accordingly, the lighting modules 200 may be classified into the high-beam-lighting module 200a and the low-beam-lighting module 200b. Here, a plurality of high-beam-lighting modules 200a may be configured to be optimized for high beam lighting and a plurality of low-beam-lighting modules 200b may be configured to be optimized for low beam lighting. The high-beam-lighting modules 200a and the low-beam-lighting modules 200b may be constructed so as to have the same specifications. The number of high-beam-lighting modules 200a and the number of low-beam-lighting modules 200b may be determined depending on a desired function of the lighting module 200.

By changing the locations at which the high-beam-lighting module 200a and the low-beam-lighting module 200b are mounted on the base plate 100, it is possible to realize various designs of the lighting apparatus.

Figure 4:
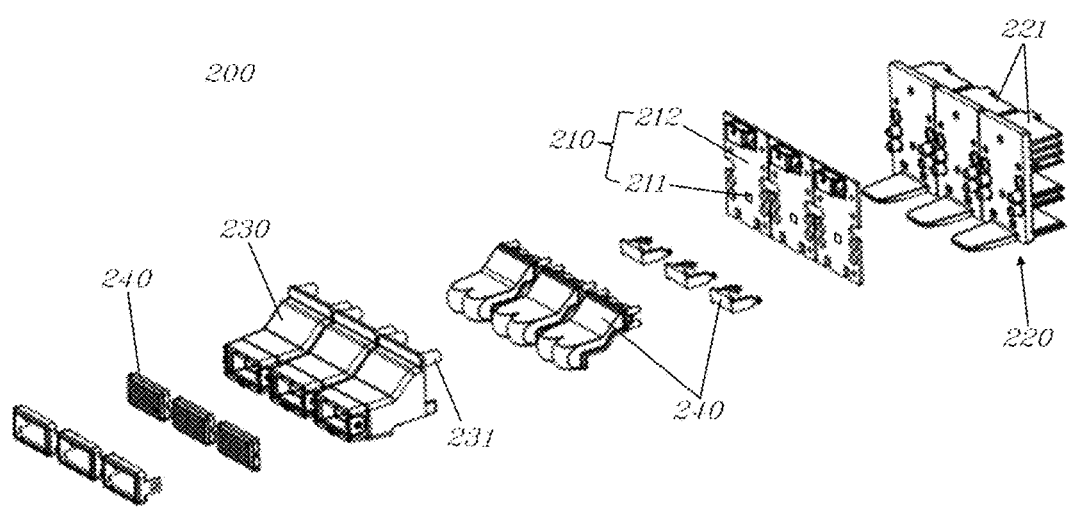
FIG. 4 is an exploded perspective view of the lighting apparatus for a vehicle according to an embodiment of the present disclosure.

As illustrated in FIGS. 1 and 4, each of the lighting modules 200 may include a light source unit 210 and a heat sink 220.

The light source unit 210 may include a light source portion 211 and a board portion 212 on which the light source portion 211 is mounted (see FIG. 4). The light source portion 211 may be replaced with or comprised of a light emitting diode (LED). The board portion 212 may be comprised of a printed circuit board (PCB) so as to transmit a light command to the light source portion 211 mounted on the PCB.

The heat sink 220 may be coupled to the board portion 212 and may include a heat dissipation portion 221 configured to dissipate heat generated during radiation of light from the light source portion 211. In other words, the heat sink 220 may be mounted on the board portion 212 in a state of being in contact therewith such that heat generated by the light source portion 211 is dissipated through the heat dissipation portion 221 so as to cool the light source portion 211. The heat dissipation portion 221 may be composed of a plurality of fins and may be formed at the side opposite the side of the heat sink 220 on which the board portion 212 is mounted.

As described above, each of the lighting modules 200 may be embodied as a standardized module including the light source unit 210 and the heat sink 220. The lighting apparatus may be constructed by a combination of the lighting modules 200 each having a light-radiating function and a heat-dissipating function.

According to an embodiment of the present disclosure, when the plurality of lighting modules 200 are mounted on the base plate 100, the board portions 212 and the heat sinks 220 of some of the lighting modules 200 may be disposed in an orientation different from the orientation of the board portions 212 and the heat sinks 220 of the other of the lighting modules 200.

Referring to FIG. 1, for example, the upper lighting modules 200b may be disposed in an orientation different from the orientation of the lower lighting modules 200a. Specifically, the board portions 212 and the heat sinks 220 of the upper lighting modules 200b may be disposed in an orientation different from the orientation of the board portions 212 and the heat sinks 220 of the lower lighting modules 200a in the forward/backward direction.

Accordingly, because the distance between the lighting modules 200 is reduced in disposition of the plurality of lighting modules 200, it is possible to optimize the disposition of the lighting modules 200. Furthermore, it is possible to prevent a problem whereby different board portions 212 or heat sinks 220 of the lighting modules 200 come into contact with each other.

Depending on a direction in which the board portions 212 are arranged, the light source portion 211 of a lighting module 200 may be disposed close to the light source portion 211 of another lighting module 200 or may be disposed so as to be spaced apart from the light source portion 211 of another lighting module 200.

According to an embodiment of the present disclosure, each of the lighting modules 200 is composed of the light source portion 211 and the board portion 212. Due to the structural characteristics of the light source portion 211 and the board portion 212, the board portion 212 may be constructed so as to be larger than the light source portion 211. Accordingly, when a plurality of lighting modules 200 are mounted on the base plate 100, the design of the lighting apparatus must be defined in consideration of interference locations of the board portion 212.

Figure 2:
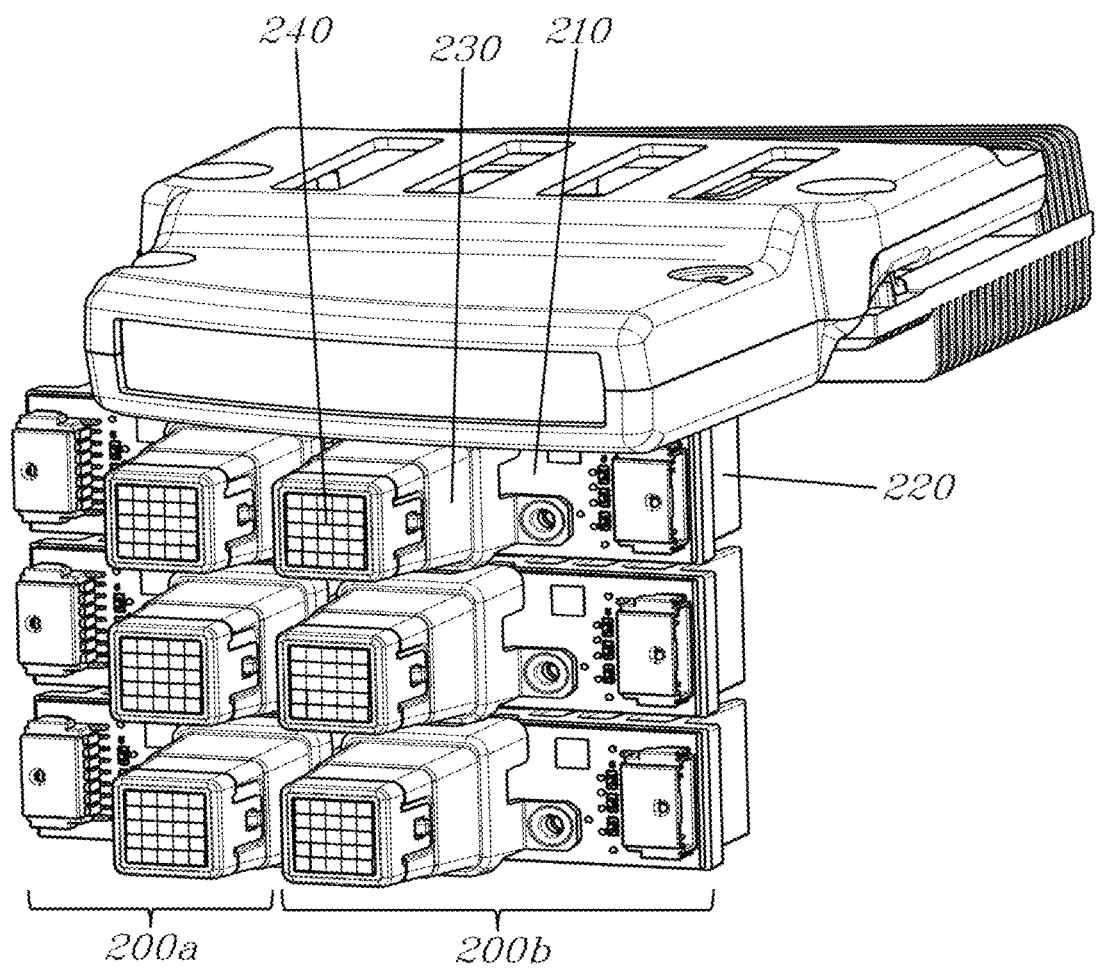
FIG. 2 is a view illustrating an embodiment of a disposition of lighting modules of the lighting apparatus for a vehicle shown in FIG. 1.

Accordingly, when the light source portion 211 of a lighting module 200 is disposed close to the light source portion 211 of another lighting module 200, as illustrated in FIG. 2, a design of the lighting apparatus in which the light source portions 211 of the lighting modules 200 are densely disposed may be created. In this case, the board portions 212 of the lighting modules 200 may be disposed in opposite directions so as to be spaced apart from each other.

Figure 3:
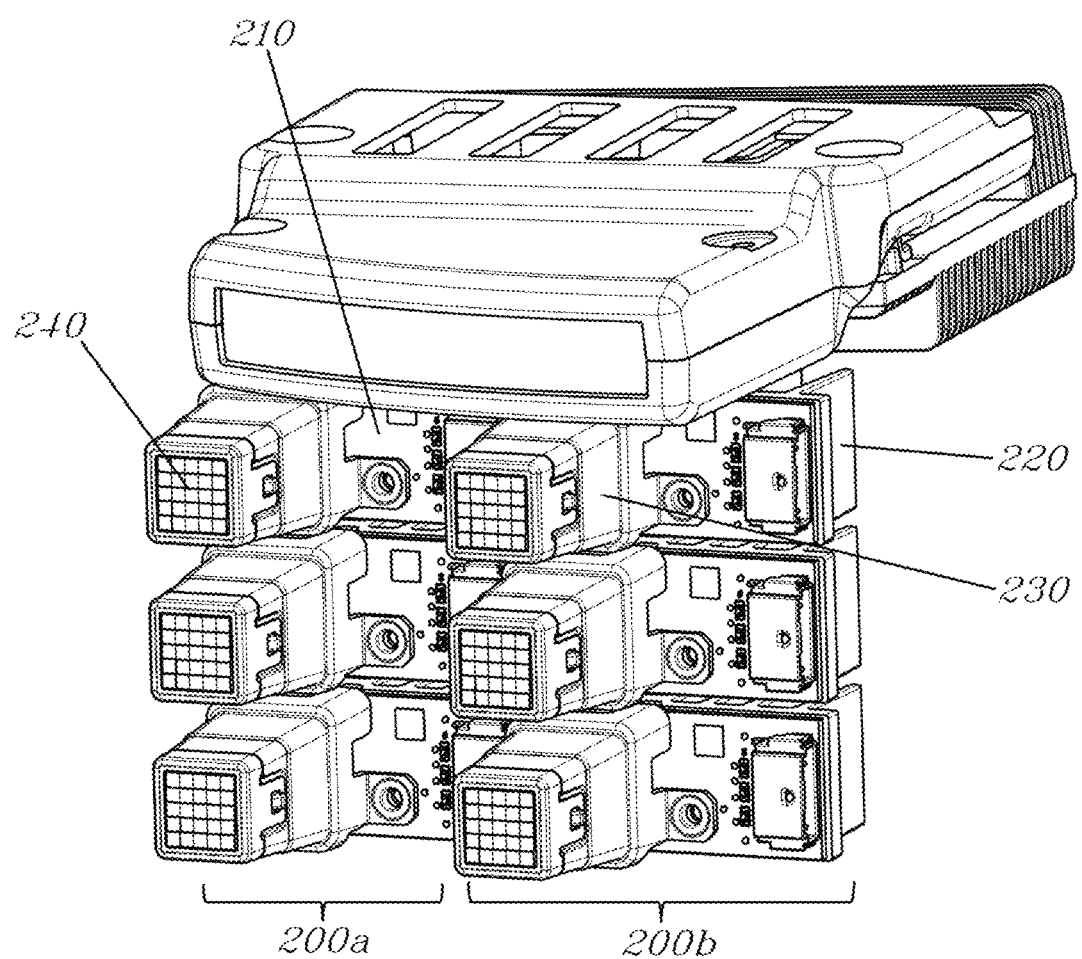
FIG. 3 is a view illustrating another embodiment of a disposition of the lighting apparatus for a vehicle shown in FIG. 1.

Meanwhile, when the light source portion 211 of a lighting module 200 is disposed so as to be spaced apart from the light source portion 211 of another lighting module 200, as illustrated in FIG. 3, a design of the lighting apparatus in which the light source portions 211 of the lighting modules 200 are spaced apart from each other is created. In this case, the lighting modules 200 may be mounted such that the light source portions 211 and the board portions 212 are alternately arranged. Instead, the lighting modules 200 may be mounted such that the board portion 212 of a lighting module 200 is disposed close to the board portion 212 of another lighting module 200. Thus, the light source portions 211 of adjacent lighting modules 200 are spaced apart from each other.

Accordingly, when the lighting modules 200 are mounted on the base plate 100, a design of the lighting apparatus may be verified depending on a direction in which the lighting modules 200 are mounted. Furthermore, by virtue of optimal disposition of the light source portions 211 and the board portions 212, it is possible to reduce a space required to mount the lighting modules 200.

The lighting modules 200 according to the above described embodiments of the present disclosure may be applied to various embodiments described hereinafter.

In an embodiment of the present disclosure, each of the lighting modules 200 may include the light source unit 210 and the heat sink 220 and may further include a holder 230 to which the light source unit 210 is mounted, as illustrated in FIG. 4.

The holder 230 may be mounted so as to include the light source portion 211 and the board portion 212 of the light source unit 210 therein. The holder 230 may be provided with a lens unit 240 through which the light radiated from the light source portion 211 passes.

Here, the lens unit 240 may include a plurality of lenses and may be configured to allow the light radiated from the light source portion 211 to be directly output to the outside through the holder 230.

The lighting module 200 may include the light source unit 210, the heat sink 220, and the holder 230. Here, the light radiated from the light source unit 210 may be output to the outside through the holder 230.

The holder 230 may extend forward and rearward. The light source portion 211 and the lens unit 240 may be arranged forward and/or rearward relative to the holder, with the result that the lighting module 200 on the base plate 100 radiates light in a spot-emitting fashion.

In other words, the holder 230 may extend in the forward and rearward directions and may be open at the front and rear ends thereof. Consequently, the light generated by the light source unit 210 may be output to the outside through the lens unit 240. Particularly, because the holder 230 is constructed so as to extend in the forward and rearward directions the surface area of the holder 230 through which the light is output may be reduced. Consequently, the light emitted through the holder 230 and the lens unit 240 may be output in a spot-emitting fashion.

By virtue of a combination of the lighting modules 200, each of which radiates light in a spot-emitting fashion, it is possible to realize various designs of the lighting apparatus depending on locations at which the lighting modules 200 are mounted on the base plate 100.

The heat sink 220 may be provided behind the light source unit 210, and may be provided with a coupler 222 which is fastened to a corresponding one of the mounting portions 110 of the base plate 100. The heat sink 220 may be provided at the board portion 212 of the light source unit 210 in the state of being in contact therewith such that heat generated by the light source unit 210 is dissipated by the heat sink 220. The heat sink 220 may be mounted on the mounting portion 110 of the base plate 100 via the coupler 222 thereof.

Here, the coupler 222 and the mounting portion 110 may be coupled to each other via various fastening structures such as using an interference fit, an interlocking structure, or a bolt structure.

The coupler 222 may be positioned in the center of the heat sink 220. In some examples, the heatsink 220 may include a plurality of couplers 222 for stable coupling of the lighting module 200.

The holders 230 of the lighting modules 200 may be formed to have the same shape at a portion or the entirety of the outer surface thereof such that the contours of the holders 230 coincide with each other when a plurality of lighting modules 200 are arranged.

The lighting apparatus according to an embodiment of the present disclosure may include a plurality of lighting modules 200. The design of the lighting apparatus may be defined depending on arrangement of the plurality of lighting modules 200. Each of the lighting modules 200 may radiate light in a spot-emitting fashion because light is output through the holder 230. Here, because the plurality of lighting modules 200 are disposed close to each other to define the design of the lighting apparatus, it may be desirable to minimize the distance between the lighting modules 200.

According to an embodiment of the present disclosure, the holders 230 of the lighting modules 200 may be formed to have the same shape in a portion or the entirety of the outer surface thereof. Consequently, when a plurality of lighting modules 200 are disposed close to each other, the outer surfaces of the holders 230 may match or be disposed adjacent to each other, thereby minimizing the distance between the lighting modules 200. Therefore, because the lighting modules 200 are stacked in a predetermined arrangement so as to minimize the distance between the lighting modules 200, aesthetics of the lighting apparatus may be improved by virtue of the plurality of lighting modules 200.

Furthermore, the holder 230 may be provided with a fastener 231, which is detachably fastened to the board portion 212 of the light source unit 210.

Because the holder 230 may be detachably fastened to the light source unit 210 in this way, it is easy to perform assembly and disassembly of the lighting apparatus.

To this end, the fastener 231 may be provided at the rear side of the holder 230 such that the holder 230 is fastened to the board portion 212 of the light source unit 210 via the fastener 231. The fastener 231 may be detachably fastened to the board portion 212 via various fastening structures, such as a hook fastening structure and a snap fit structure.

In addition, because the holder 230 is mounted on the board portion 212 of the light source unit 210 which provides an installation space, the light source unit 210 and the holder 230 may be stably fastened to each other.

In another embodiment, the fastener 231 may pass through the board portion 212 of the light source unit 210 and may be detachably fastened to the heat sink 220 such that the light source unit 210 is fixed to the heat sink 220 by the holder 230.

In other words, the lighting module 200 according to an embodiment of the present disclosure may include the light source unit 210, the heat sink 220, and the holder 230, which are connected to one another. Here, because the fastener 231 of the holder 230 may extend rearwards through the board portion 212 of the light source unit 210 and may be fastened to the heat sink 220, the light source unit 210, the heat sink 220, and the holder 230 may be connected to one another via the fastener 231.

In this way, since the heat sink 220 is also fastened and fixed to the light source unit 210 when the holder 230 is connected to the light source unit 210, it is possible to facilitate assembly and disassembly of the light source unit 210, the heat sink 220, and the holder 230.

Figure 5:
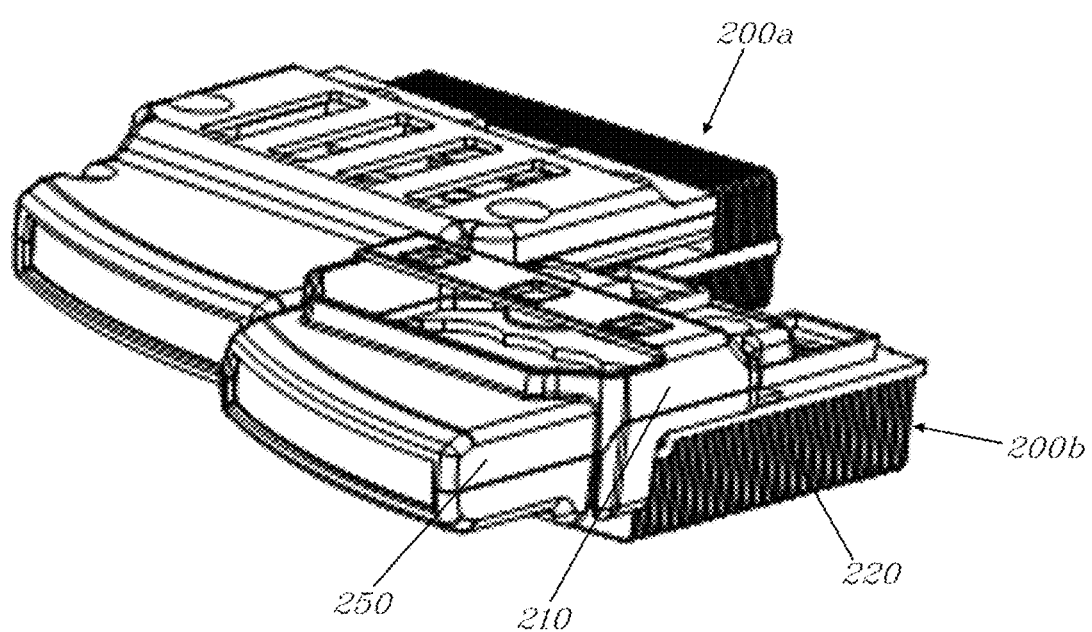
FIG. 5 is a view illustrating a lighting apparatus for a vehicle according to another embodiment of the present disclosure.
Figure 6:
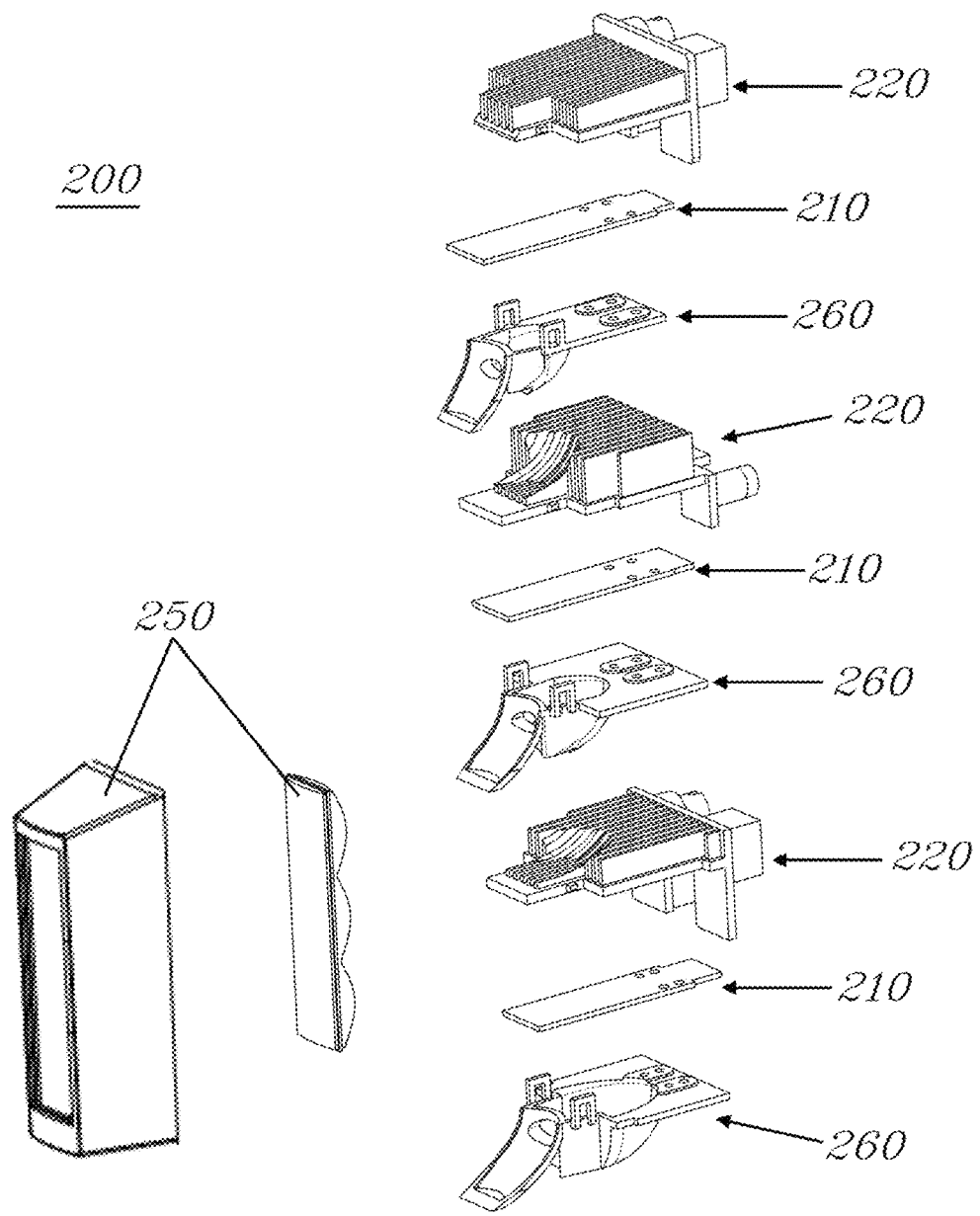
FIG. 6 is an exploded perspective view of the lighting apparatus for a vehicle according to another embodiment of the present disclosure.

In another embodiment illustrated in FIG. 5, the lighting module 200 may include a plurality of light source units 210, which are arranged in a vertical direction or a lateral direction. The plurality of light source units 210 may be unified through a single lens portion 250, with the result that the lighting module 200 on the base plate 100 may radiate light in a surface-emitting fashion.

In this way, the lighting module 200 may be composed of a plurality of light source units 210, which have different areas through which light is output. The plurality of light source units 210 may be arranged in a vertical direction or a lateral direction. Particularly, the plurality of light source units 210 may be unified through the lens portion 250, and the light radiated from the plurality of light source units 210 may be output through the lens portion 250. Consequently, the lighting module 200 according to another embodiment of the present disclosure may radiate light in a surface-emitting fashion.

Here, the lighting module 200 may further include a reflection unit 260 configured to reflect the light radiated from the light source unit 210 and to output the light through the lens portion 250. In other words, the light source units 210 constituting the lighting module 200 may include the light source portions 211, which are disposed so as to emit light in a vertical direction or a lateral direction in which the light source units 210 are arranged. The reflection units 260 may reflect the light radiated from the light source portions 211 of the light source units 210 and may output the light through the lens portion 250.

Specifically, the plurality of reflection units 260 may be disposed in a vertical direction or a lateral direction so as to be aligned with respective light source units 210. The light source units 210 and the reflection units 260 may be provided in the lens portion 250. Consequently, light may be emitted from the entire area of the lens portion 250 in a surface-emitting fashion. A sufficient amount of light provided by the lighting module 200 may be assured, thereby satisfying traffic regulations and improving product marketability.

The plurality of light source units 210 may have different lighting areas. The reflection units 260 may decide the directions in which light is emitted from the light source units. For example, light radiated from one of the light source units 210 may be concentrated on a target point via a corresponding reflection unit 260. Light radiated from another light source unit 210 may be spread around the target point via a corresponding reflection unit 260. Light radiated from a further light source unit 210 may be concentrated on a point above the target point via a corresponding reflection unit 260. Consequently, the lens portion 250 may create a projected image of the light formed on the target point by means of the plurality of light source units 210, which are set to emit light to a different area.

Accordingly, the lighting apparatus according to another embodiment of the present disclosure is capable of realizing various designs of the lighting apparatus by combination of lighting modules 200 each of which emits light in a surface-emitting fashion.

The heat sink 220 may include a plurality of heat sinks. The coupler 222, which is fastened to the mounting portion 110 of the base plate 100, may be formed at one or each of the plurality of heat sinks 220. The heat sink 220 may be in contact with the board portion 212 of the light source unit 210 such that the heat generated by the light source unit 210 is dissipated via the heat sink 220. The heat sink 220 may be mounted on the mounting portion 110 of the base plate 100 via the coupler 222.

The coupler 222 and the mounting portion 110 may be coupled to each other via various coupling structure, such as by using an interference fit, an interlocking structure, or a bolt structure.

The coupler 222 may be disposed at one of the plurality of heat sinks 220 included in the lens portion 250 or may be disposed at each of the heat sinks 220 of the lighting module 200 for provision of additional coupling rigidity.

As described above, the lighting module 200 according to an embodiment of the present disclosure may be operated in a spot-emitting fashion or a surface-emitting fashion.

Figure 7:
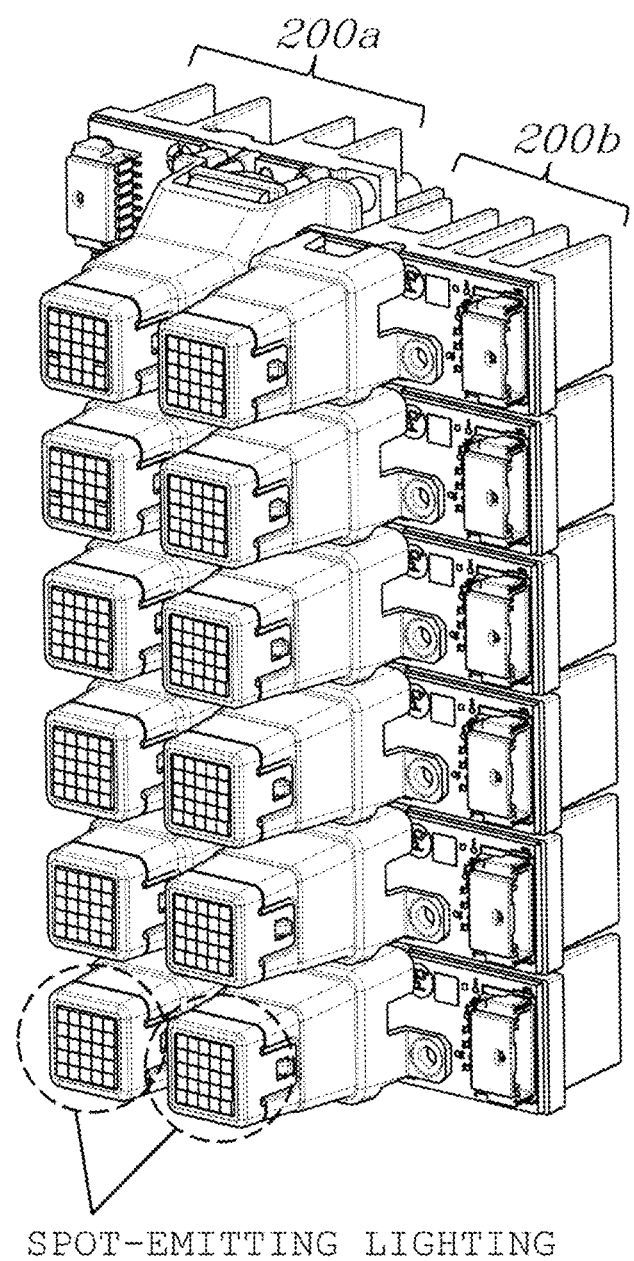
FIG. 7 is a view illustrating an embodiment of a lighting unit in a spot-emitting configuration.

Accordingly, the spot-emitting-type lighting modules 200 may be arranged horizontally, as illustrated in FIG. 1, or may be arranged vertically, as illustrated in FIG. 7.

Figure 8:
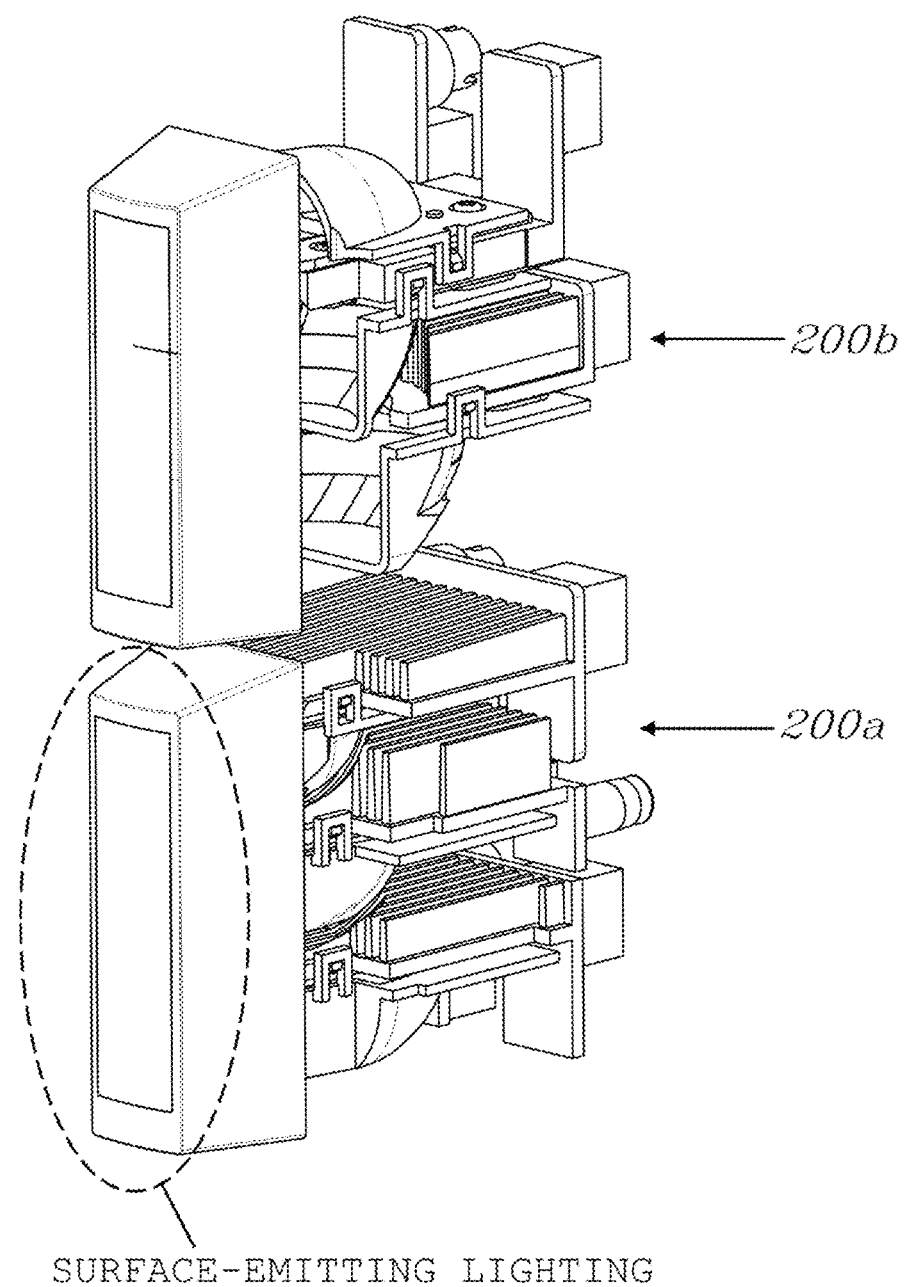
FIG. 8 is a view illustrating an embodiment of a lighting unit in a surface-emitting configuration.
Figure 9:
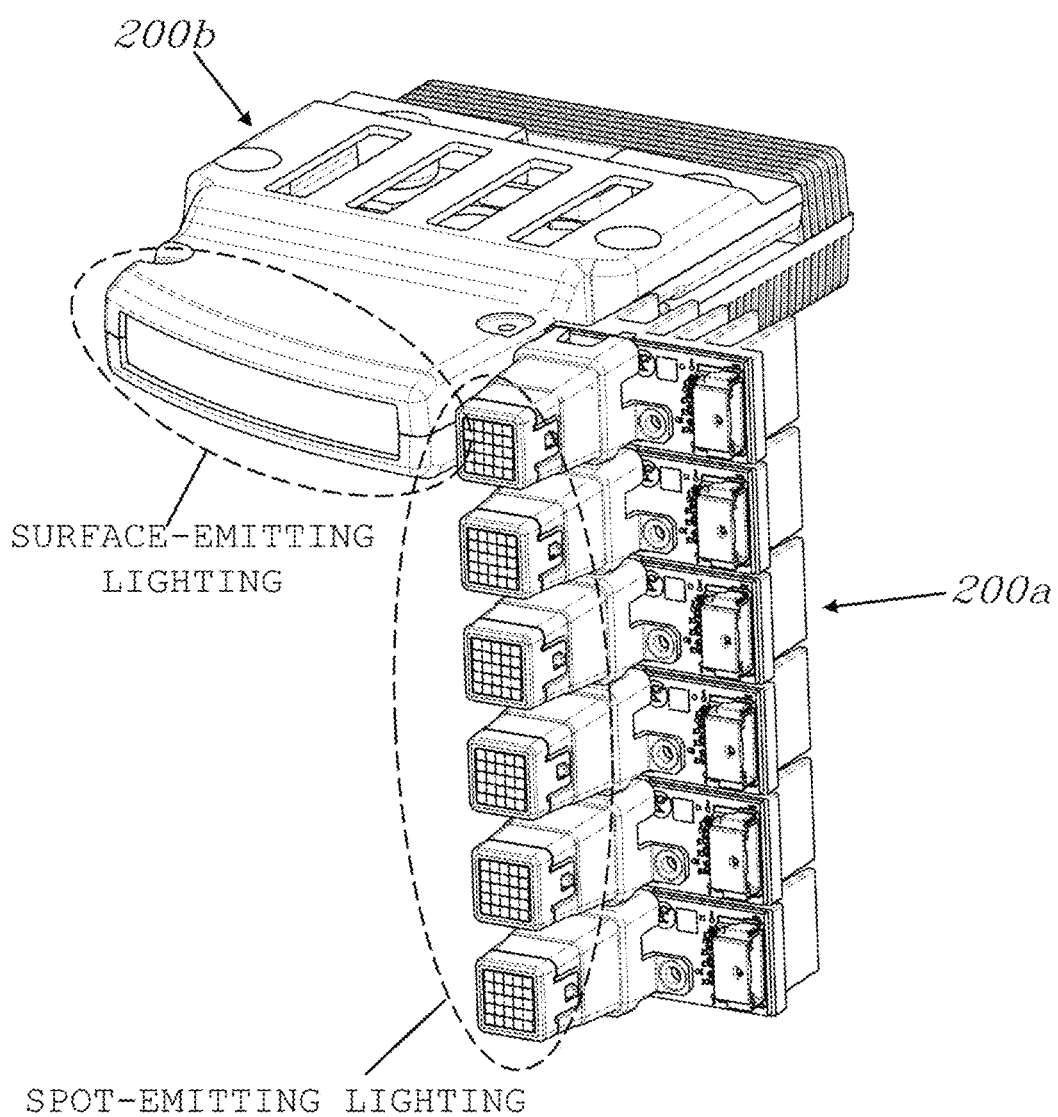
FIG. 9 is a view illustrating an embodiment in which a spot-emitting-type lighting unit and a surface-emitting-type lighting unit are combined with each other.
Figure 10:
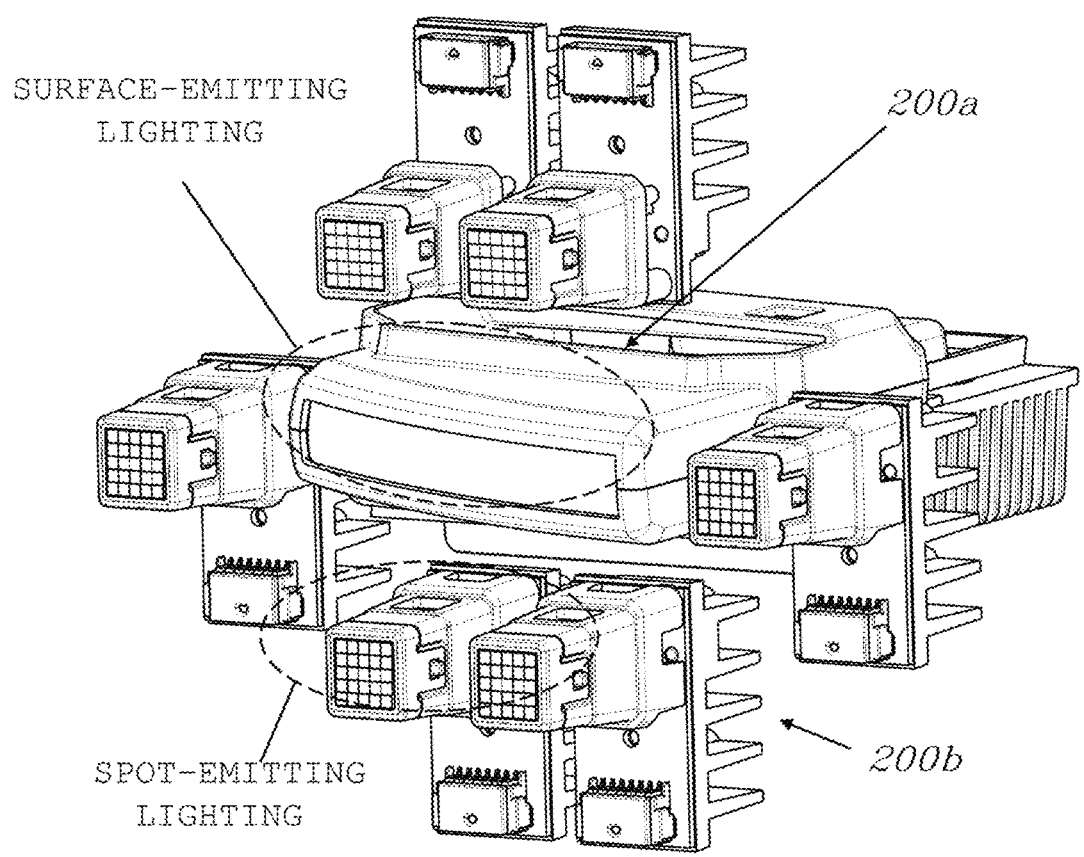
FIG. 10 is a view illustrating another embodiment in which a spot-emitting-type lighting unit and a surface-emitting-type lighting unit are combined with each other.
Figure 11:
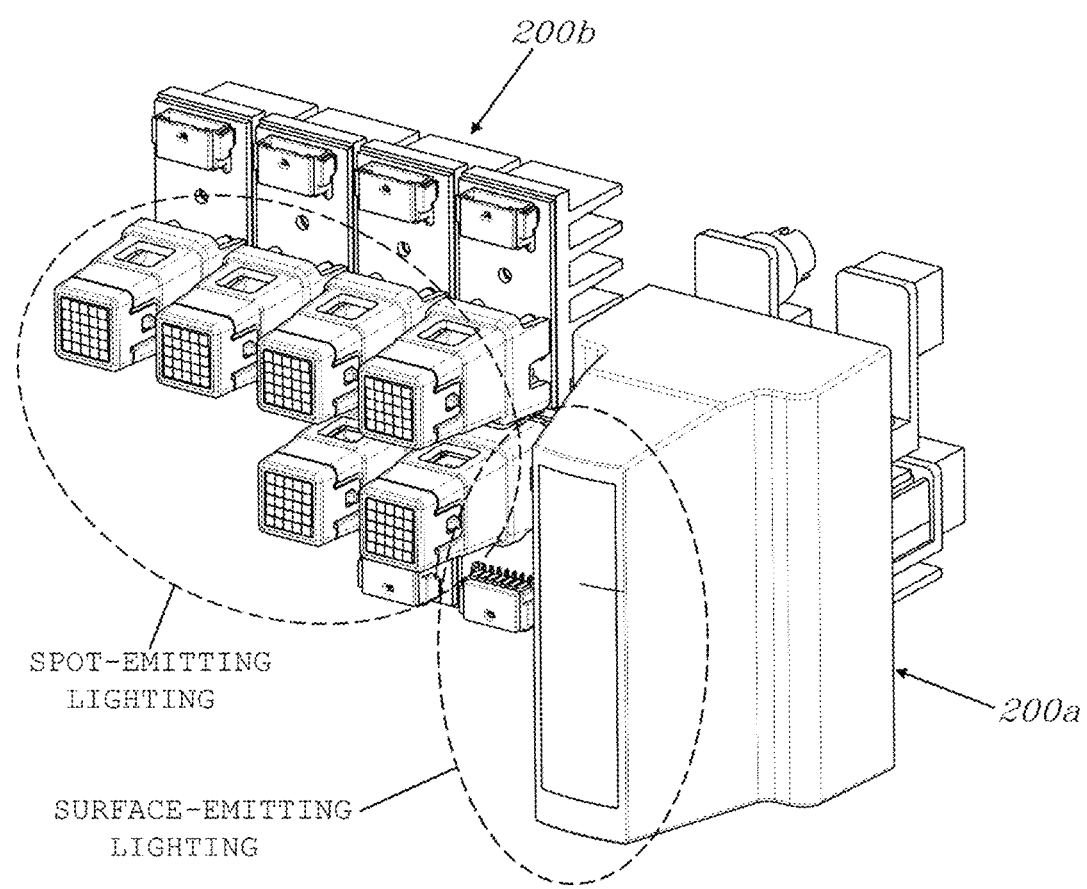
FIG. 11 is a view illustrating a further embodiment in which a spot-emitting-type lighting unit and a surface-emitting-type lighting unit are combined with each other.

Alternatively, the surface-emitting-type lighting modules 200 may be arranged horizontally, as illustrated in FIG. 5, or may be arranged vertically, as illustrated in FIG. 8.

In addition, the spot-emitting-type lighting modules 200 and the surface-emitting-type lighting modules 200 may be combined with each other in various mounting directions and arrangements in order to diversify the design of the lighting apparatus. Accordingly, various types of lighting apparatuses may be realized without being limited to the embodiments shown in the drawings.

Figure 12:
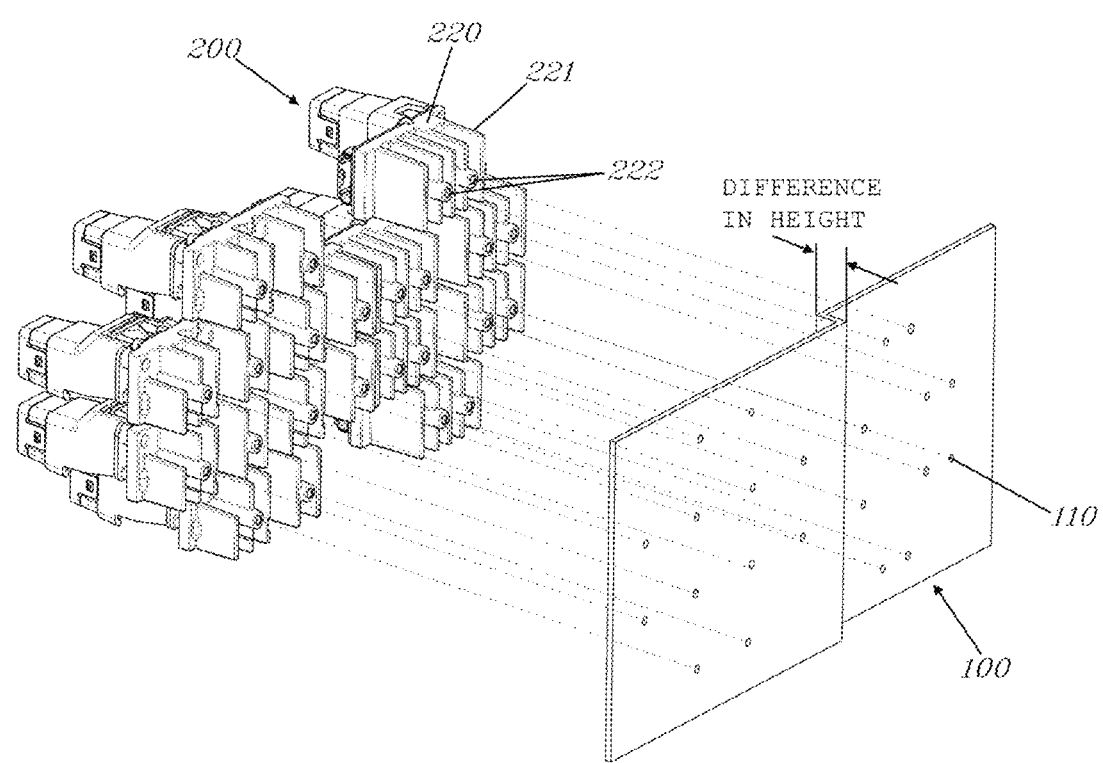
FIG. 12 is a view illustrating a base plate of the lighting apparatus for a vehicle according to an embodiment of the present disclosure.

As illustrated in FIG. 12, the base plate 100 may be partitioned into two parts such that two base plate parts have a difference in height therebetween and are spaced apart from each other in the forward/backward direction.

Because the base plate 100 is formed such that a part thereof has a difference in height with respect to the other part, the positions at which the lighting modules 200 mounted on a part of the base plate 100 may be spaced apart from the lighting modules 200 mounted on the other part of the base plate 100 in the forward/backward direction. In other words, because the base plate 100 may be formed so as to have a stepped portion, the light radiated from the lighting modules 200 may be stereoscopically projected due to the difference in position between the lighting modules 200 mounted on the front plate part and the lighting modules 200 mounted on the rear plate part.

In this way, because the base plate 100 may be partitioned into a plurality of plate parts such that a stepped portion is formed therebetween, it is possible to realize various designs of the lighting apparatus by virtue of stereoscopic projection of the light from the lighting modules 200. Stereoscopic projection of light from the lighting modules 200 may advantageously increase visibility at varying distances in front of the lighting module 200.

As should be apparent from the above description, the lighting apparatus for mobility vehicle according to the present disclosure is capable of providing diverse lighting design by virtue of various combinations of standardized lighting modules. The lighting apparatus is also capable of facilitating replacement and thus reducing repair cost when some of the lighting modules malfunction.

Although several embodiments of the present disclosure have been described above with reference to the accompanying drawings, those of ordinary skill in the art should appreciate that the present disclosure can be implemented in various other embodiments without changing the technical ideas or features thereof.

What is claimed is:

1. A lighting apparatus for a vehicle, the lighting apparatus comprising:
    a base plate including a plurality of mounting portions; and
    a plurality of lighting modules detachably mounted to the plurality of mounting portions,
    wherein the plurality of lighting modules is configured to radiate light and to define a design of the lighting apparatus depending on locations at which the lighting modules are mounted,
    wherein each lighting module of the plurality of lighting modules includes at least one light source unit and at least one heat sink,
    wherein the at least one light source unit comprises a light source portion configured to radiate light and a board portion on which the light source portion is mounted,
    wherein the at least one heat sink is coupled to the board portion and includes a heat dissipation portion configured to dissipate heat generated during radiation of light from the light source portion,
    wherein the at least one heat sink is provided behind the at least one light source unit in a direction opposite to a light emitting direction of the light source unit and the heat dissipation portion is provided with a coupler, which is coupled to the mounting portion of the base plate, and
    wherein the heat dissipation portion extends from the heat sink and the coupler extends from heat dissipation portion, in the direction opposite to the light emitting direction of the light source unit, and the coupler is positioned in a center of the heat sink.

2. The lighting apparatus according to claim 1, wherein the plurality of lighting modules includes at least one high beam lighting module and at least one low beam lighting module.

3. The lighting apparatus according to claim 1, wherein the plurality of lighting modules is arranged such that a light source portion of one lighting module of the plurality of lighting modules is disposed so as to be close to or to be spaced apart from a light source portion of another lighting module of the plurality of lighting modules depending on a direction in which the respective board portions are arranged.

4. The lighting apparatus according to claim 1, wherein each lighting module further comprises a holder to which the at least one light source unit is mounted, the holder including a lens unit through which light radiated from the at least one light source unit is transmitted.

5. The lighting apparatus according to claim 4, wherein the holder extends in a forward/rearward direction, and
    wherein the at least one light source portion and the lens unit are disposed in the forward/rearward direction relative to the holder such that the lighting module on the base plate radiates light in a spot-emitting fashion.

6. The lighting apparatus according to claim 4, wherein a portion or an entirety of an outer surface of each lighting module has the same shape such that contours of the holders of the plurality of lighting modules coincide with each other when the plurality of lighting modules is arranged in the lighting apparatus.

7. The lighting apparatus according to claim 4, wherein the holder includes a fastener, which is detachably fastened to the board portion of the at least one light source unit.

8. The lighting apparatus according to claim 7, wherein the fastener is detachably fastened to the at least one heat sink through the board portion of the at least one light source unit such that the light source unit and the at least one heat sink are held by the holder.

9. The lighting apparatus according to claim 1, wherein each lighting module includes a plurality of light source units, which are arranged in a vertical direction or in a horizontal direction and are unified through a single lens portion such that the lighting module on the base plate radiates light in a surface-emitting fashion.

10. The lighting apparatus according to claim 9, wherein each lighting module further includes at least one reflection unit configured to reflect light radiated from a corresponding one of the plurality of light source units and configured to output the light through the lens portion.

11. The lighting apparatus according to claim 10, wherein the at least one reflection unit comprises a plurality of reflection units,
    each reflection unit of the plurality of reflection units is disposed in a vertical direction or a horizontal direction so as to correspond to a respective one of the plurality of light source units, and
    the plurality of light source units and the plurality of reflection units are provided in the lens portion.

12. The lighting apparatus according to claim 9, wherein the at least one heat sink of each lighting module comprises a plurality of heat sinks,
    the plurality of heat sinks is connected to a corresponding one of the plurality of light source units, and
    one or each of the plurality of heat sinks is provided with a coupler, which is coupled to a corresponding one of the plurality of mounting portions of the base plate.

13. The lighting apparatus according to claim 1, wherein the base plate is partitioned into a plurality of base plate parts, which have a difference in height therebetween such that mounting portions of one of the plurality of base plate parts are spaced apart from mounting portions of another of the plurality of base plate parts in a forward/rearward direction.

14. The lighting apparatus according to claim 1, wherein the plurality of lighting modules is mounted on the base plate such that a board portion and a heat sink of one lighting module of the plurality of lighting modules are disposed in an orientation different from an orientation of a board portion and a heat sink of an adjacent lighting module of the plurality of lighting modules.

* * * * *